United States Patent
Meuronen

(10) Patent No.: US 6,473,622 B1
(45) Date of Patent: Oct. 29, 2002

(54) BILLING MOBILE TERMINATED SHORT MESSAGES

(75) Inventor: Timo Meuronen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/454,119

(22) Filed: Dec. 3, 1999

Related U.S. Application Data

(63) Continuation of application No. PCT/FI98/00474, filed on Jun. 2, 1998.

(30) Foreign Application Priority Data

Jun. 3, 1997 (FI) .................................................. 972356

(51) Int. Cl.[7] .............................................. H04Q 7/20
(52) U.S. Cl. ........................ 455/466; 455/406; 455/408
(58) Field of Search ................................ 455/406, 407, 455/408, 409, 466; 370/317

(56) References Cited

U.S. PATENT DOCUMENTS

| | | |
|---|---|---|
| 4,640,986 A | 2/1987 | Yotsutani et al. |
| 5,577,102 A | 11/1996 | Koivunen |
| 5,768,509 A * | 6/1998 | Gunluk ........................ 455/466 |
| 5,822,310 A * | 10/1998 | Chennakeshu et al. ..... 370/317 |

FOREIGN PATENT DOCUMENTS

| | | |
|---|---|---|
| FI | 96731 | 12/1993 |
| FI | 96374 | 2/1996 |
| FI | 100137 | 4/1996 |
| FI | 944738 | 4/1996 |
| WO | WO 93/26131 | 12/1993 |
| WO | WO 96/06508 | 2/1996 |
| WO | WO 96/11453 | 4/1996 |
| WO | WO 96/13814 | 5/1996 |
| WO | WO 97/19568 | 5/1997 |
| WO | WO 97/26739 | 7/1997 |

OTHER PUBLICATIONS

Mouly, et. al., The GSM System for Mobile Communications, 1992.

* cited by examiner

*Primary Examiner*—Nay Maung
(74) *Attorney, Agent, or Firm*—Altera Law Group, LLC

(57) ABSTRACT

A method and an equipment implementing the method for implementing the billing of short messages in a mobile communication system. The method comprises steps wherein a message is submitted to a short message service centre to be delivered to a subscriber; the message is delivered from the short message service centre to the mobile station of the subscriber via the mobile communication system; and at least one charge record is created per each transferred short message. In the solution of the invention the short message comprises an advice of charge which directly or indirectly indicates the price to be billed for reception of the short message, and the object of the billing; and said advice of charge or an actual advice of charge defined on the basis thereof is included in a charge record created on the basis of the short message. The solution allows the billing to be directed message-specifically to different payers and specific so as to correspond to the value to be determined on the basis of the contents of the short message. The present method can be easily implemented and does not cause significant changes in existent systems

8 Claims, 3 Drawing Sheets

BILLING MOBILE TERMINATED SHORT MESSAGES

This application is a continuation of international application Ser. No. PCT/FI98/00474, filed June 2 1998.

BACKGROUND OF THE INVENTION

The invention relates to mobile communication systems, and particularly to a method of implementing the billing of short messages in a mobile communication system. The method comprises steps in which a message is submitted to a short message service centre to be delivered to a subscriber; the message is delivered from the short message service centre to the subscriber's mobile station via the mobile communication system, and at least one charge record is created per each transferred short message.

In addition to normal speech and data connections set up on traffic channels in digital mobile communication systems, short digital data messages, short messages, transferred on the control and signalling channels of the systems, may be sent amid actual signalling. These messages are generally called short messages. A short message service centre is added in association with the mobile communication system for implementing short messages. In connection with a mobile originated short message, a subscriber creates the short message by means of the keyboard of a terminal, and the terminal submits the short message on a signalling channel via a base station and a mobile switching centre to the short message service centre. The short message service centre relays the short message to another network, or on signalling channels via the mobile communication network to the terminal of another subscriber, or to another destination.

Services offered to subscribers via short messages also increase constantly. Several in e.g. voice and text mode delivered services may be offered to subscribers along with short messages. In addition to normal mobile terminating (MT) and mobile originated (MO) short messages, a subscriber may receive e.g. notices, ads, personal reminders, and may order information on sources offering these to his/her mobile station.

Up to now the sender of a message has been billed for short messages by the same unit tariff essentially on the basis of sender and receiver information included in the message. With the services associated with short messages becoming more developed, this method is, however, becoming insufficient.

To be able to provide services, a service provider has to charge a reasonable price for the services, and similarly, a subscriber to a service has to be prepared to pay for each service a price proportional to its value. In order for the production and use of services to be rational, the price of the service has to be at the right level as to both functions. It is evident that the price to be billed for e.g. stock exchange rates and analyses made on the basis thereof has to be higher than that of a usual mobile originated mobile terminating short message, and that a subscriber using said service is also prepared to pay a reasonable price for the information. In order to be able to provide and use different services in a sensible way, the billing of short messages has to be diversified correspondingly.

A proposal for solving the matter is service provider-specific billing, whereby the subscriber is always billed according to a predetermined tariff for short messages transmitted from a source address providing services. This, however, limits one destination address to one equivalent service, limiting significantly the prospects of service providers. If e.g. the same media house provides both far processed stock exchange information and simple weather reports, a billing system based merely on the address of the service provider is not appropriate.

BRIEF DESCRIPTION OF THE INVENTION

It is the object of the present invention to provide a simple and easily implemented way to bill services implemented by means of short messages in accordance with the value of the offered service. The aims of the invention are achieved by a method according to the independent claim 1, characterized in that an advice of charge is included in a short message for directly or indirectly indicating the price to be billed for reception of the short message, and the object of the billing; and said advice of charge or an actual advice of charge defined on the basis thereof is. included in a charge record created on the basis of the short message.

The invention also relates to a short message service centre to be linked to a mobile communication system according to claim 6, the centre relaying a submitted message to a subscriber's mobile station via the mobile communication system. The short message service centre is characterized in that it is arranged to include in a charge record created on the basis of the short message an advice of charge indicating the price to be billed for the reception of the short message, and the object of the billing.

The invention also relates to a short message service centre to be linked to a mobile communication system according to claim 7, the centre relaying a submitted message to the mobile station of a subscriber via the mobile communication system and creating at least one charge record on the basis of the short message. The short message service centre is characterized in that it is arranged to include in a charge record created on the basis of the short message an advice of charge indicating the price to be billed for the reception of the short message, and the object of the billing.

The invention also relates to a short message gateway MSC of a mobile communication system according to claim 8, the MSC relaying a short message sent by a short message service centre to a mobile station and creating at least one charge record on the basis of the short message. The short message gateway MSC is characterized in that it is arranged to include in a charge record created on the basis of the short message an advice of charge indicating the price to be billed for the reception of the short message, and the object of the billing.

The preferred embodiments of the invention are disclosed in the dependent claims.

The invention is based on the idea that information on the billing value of a short message is transferred to the unit creating the charge records included in a short message. The information can be directly tariff data. The data preferably indicates the tariff class on the basis of which the unit creating the charge records can determine the right tariff. Said unit creating the charge records of the short messages comprises a functionality by which it transfers the tariff into the charge record which is normally sent onwards to the unit responsible for billing.

It is an advantage of the solution of the invention that short message billing can be directed message-specifically to different payers and specified so as to correspond to the value to be determined on the basis of the contents of the short message. The present method can be easily implemented and does not cause significant changes in existent systems.

SHORT DESCRIPTION OF THE DRAWINGS

The invention will be described in more detail in connection with the preferred embodiments with reference to the attached drawings, in which.

DETAILED DESCRIPTION OF THE INVENTION

In the following the invention will be described by using as an example the short message service of the GSM mobile communication system (Global System for Mobile Communications, GSM), but the invention may also be applied to other similar radio systems employing the same kind of message service, such. as DCS1800 (Digital Communication System) and PCN (Personal Communication Network), and to mobile communication systems according to the EIA/TIA INTERIM standard.

Figure 1:
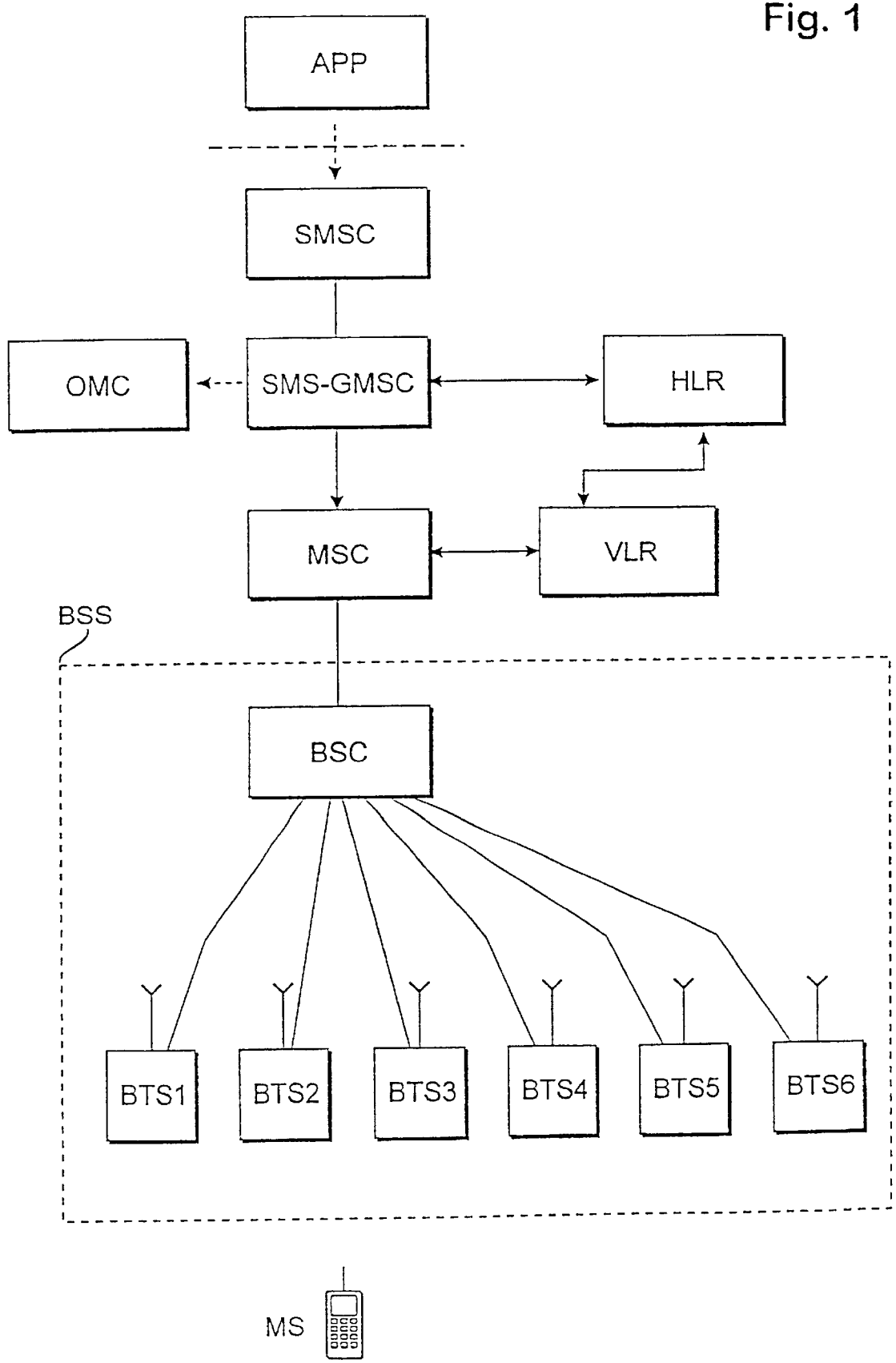
FIG. 1 is a block diagram illustrating the basic structural parts of the GSM system.

FIG. 1 shows briefly the basic structural parts of the GSM system, but without a more detailed description of their characteristics or other sub-areas of the system. As to a more detailed description of the GSM system, reference is made to the GSM recommendations and the publication "The GSM system for Mobile Communications", M. Mouly and M. Pautet, Palaiseau, France, 1992, ISBN: 2-9507190-0-0-7.

A mobile switching centre MSC attends to switching incoming and outgoing calls. It performs tasks similar to those carried out by a.centre in the public telephone network (PSTN). In addition, it also performs operations typical of mobile telephone traffic only, such as e.g. subscriber location administration, in co-operation with the subscriber registers of the network. The subscriber registers in the GSM system are called a home location register HLR and a visitor location register VLR. HLR stores permanently subscriber data and information on the VLR within whose area a MS is located. The visitor location register VLR again stores subscriber data of a mobile station MS temporarily during the time the mobile station is in the area of the mobile switching centre MSC associated with the visitor location register VLR. Typically, one VLR serves one mobile switching centre MSC. Mobile stations MS are connected to the centre MSC by means of base station systems BSS. The base station system BSS comprises base station controllers BSC and base stations BTS. One base station controller BSC is used for the control of several base stations BTS.

Each base station BTS has at its disposal one or more carrier wave pairs by which it can set up a duplex radio connection with a mobile station MS roaming in its area. Each carrier wave is divided into several, generally eight, TDMA time slots, i.e. channels. These GSM system channels can be divided into two categories: traffic channels (TCH) and control or signalling channels (CCH). Speech or data may be transmitted on traffic channels, and a traffic channel is always allocated to one call only. Control or signalling channels are used for the signalling needed for system control. Fixed signalling and traffic channels exist between a base station BTS, a base station controller BSC, and a mobile switching centre MSC.

There are several types of control channels. A Broadcast Control Channel BCCH is a unidirectional control channel from a base station BTS to a mobile station MS, and is used for transmitting to the mobile station cellspecific information on effect levels used, BCCH frequencies of adjacent cells, etc. A BCCH channel also includes data on synchronization and frequency correction, by means of which the mobile station is locked into the system.

Having been locked, the mobile station MS listens to base station BTS calls on a Common Control Channel CCCH, used solely to set up a signalling connection. A connection is established in several stages: 1) forwarding a call from a base station BTS to a mobile station MS 1, 2) transmission of a random access generated by the mobile station MS as a result of the received call, or otherwise, from the mobile station to the base station BTS, and 3) allocation of a Stand alone Dedicated Control Channel SDCCH to the connection. Actual signalling between the base station and the mobile station MS is carried out on the SDCCH control channel. If the signalling on the SDCCH channel is call set-up signalling, the connection is transferred to a traffic channel TCH.

A parallel control channel SACCH (Slow Associated Control Channel) is used along with a traffic channel TCH defined for data or speech transmission between a base station BTS and a mobile station MS, or a connection-specific control channel SDCCH defined for signalling between them. A parallel control channel is mainly used for transmission of measurements performed by the mobile station MS during the connection from the mobile station to the base station BTS.

In the GSM mobile communication system, SDCCH and SACCH control channels may be used for transmission of short digital data messages, i.e. what are known as Short Messages, between a mobile station MS and a Short Message Service Centre SMSC linked to the system. The short message service centre is a centre linked to the GSM system and via which short messages are transmitted and can be stored there for later transmission in case the receiving party is not reached. Short messages are transmitted to the GSM system via one or more mobile switching centres acting as a short message service centre SMS-GMSC. In the GSM recommendations, the term GMSC refers to a gateway MSC delivering mobile terminating (MT-SMS) short messages, and correspondingly, the term IW-MSC refers to a gateway MSC submitting mobile originated (MO-SMS) messages. Below, these gateway MSCs are referred to by the term short message gateway MSC SMS-GMSC.

In the GSM system, short messages are data messages with a maximum length of 140 bytes. A short message may be a Mobile Terminating MT delivery or a Mobile originated MO short message submission. A cell broadcast may also be carried out via the short message service, whereby a message is sent to all mobile stations in the area of one or more cells.

If a mobile station MS has a connection on a traffic channel TCH, short messages are forwarded on the SACCH control channel. Otherwise the short messages are forwarded on the SDCCH control channel. HLR and VLR are used for routing short messages in a mobile communication network essentially similarly as for routing calls.

In order for the operator to be able to bill the subscriber for mobile communication system services, a mechanism for storing an adequate amount of data regarding each chargeable service is arranged in the traffic handling part of the network. In the mobile switching centres participating in the connection, a connection-specific record TT (Toll Ticket, TT) containing sufficient information for calculating the costs of the connection is created per each connection at least when the call is terminated. The detailed contents of record TT depend on the chosen MSC technique and operator needs, but all records TT contain certain basic data including identifiers of the parties, call type, essential routing information, information on connection status, times and duration associated with the connection, and cell-specific data. Records TT are stored as a file in the I/O equipment of mobile switching centres, the file being transferred in a manner agreed upon to the billing system for further processing. One data item in record TT describes the nature of the connection, i.e. if it is a call, a short message, or something else. Typically, the billing of short messages has up to now been carried out per unit price on the basis of said data.

Figure 2:
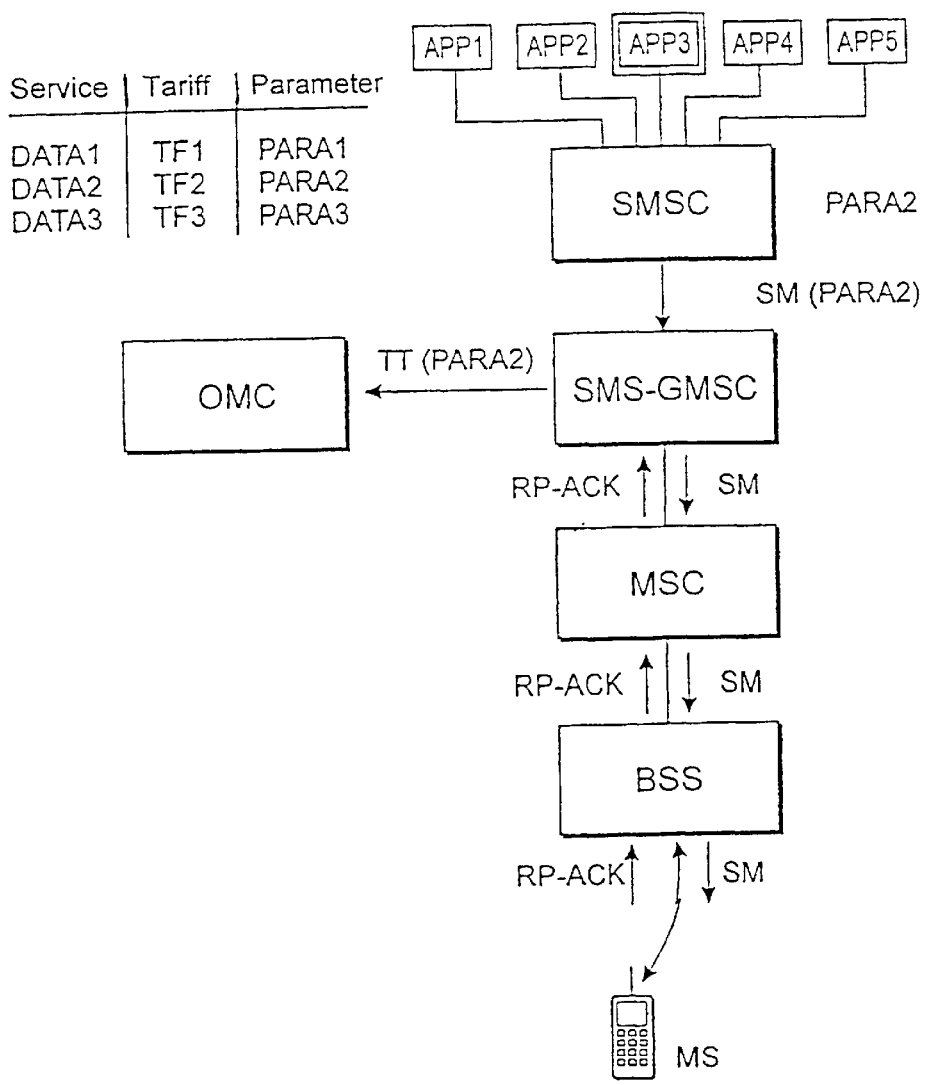
FIG. 2 is a block diagram illustrating a preferable embodiment of the invention.

The block diagram in FIG. 2 illustrates a preferred embodiment of the invention. FIG. 2 describes a situation in which a medium house providing information services maintains an application program APP3 via which various different information is offered via short messages on a subscriber's request to the use of subscribers. Part of the information is very simple basic data, but a part is valuable information, for the processing and delivery of which the service provider requires payment in order to maintain profitability.

The application program APP3 is associated with the short message service centre SMSC operating in connection with a mobile communication system. GSM specifications define three alternative protocols for the interface between a short message service centre SMSC and a short message gateway MSC of a mobile communication system. Of these three alternatives, the OSI2 layer protocol, generally used in the short message service centres of the applicant, is used to specify the present invention, without, however restricting the invention to this alternative. Depending on the producer, the relaying functionality of a short message service centre SMSC and a short message gateway MSC SMS-GMSC is located either on the side of the gateway MSC or the short message service centre. In this example it is located in the short message gateway MSC SMS-GMSC, the creation of the short message billing units also taking place in the short message gateway MSC SMS-GMSC.

Figure 3:
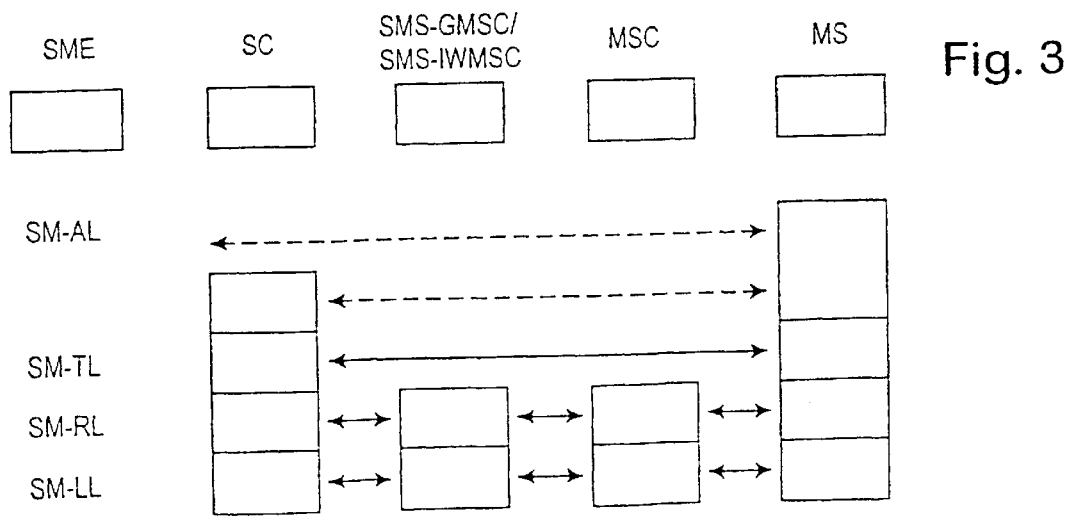
FIG. 3 illustrates a protocol architecture used in short message transfer according to the GSM specifications.

FIG. 3 shows a protocol architecture used in short message transfer according to the GSM specifications. In the GSM system, SM-TP (Short Message Transport Layer Protocol) is a protocol defined between a short message service centre SMSC and a mobile station. In this protocol, a SMS-DELIVER message is a data message transmitted from the short message service centre to the mobile station, and correspondingly, a SMS-SUBMIT is a data message transmitted from the mobile station to the short message service centre. SM-RP is a protocol layer between a mobile station and a mobile switching centre MSC of the GSM network, chiefly associated with references and address information. An RP-MT-DATA message is a data message of the RP layer terminating in a mobile station, and correspondingly, an RP-MO-DATA message is a data message of the RP layer originated from a mobile station.

As can be seen from FIG. 3, in the embodiment described it is practical to perform data transfer between the short message gateway MSC SMS-GMSC and the short message service centre SMSC, the data transfer not necessarily being transferred to a mobile station MS, via a parameter included in the messages of the RL layer. The parameter may contain direct tariff data that the gateway MSC SMS-GMSC can transfer directly to a charge record. Alternatively, the parameter may comprise an index employed to refer to a table stored in the gateway MSC SMS-GMSC, from where the short message gateway MSC can read the tariff data associated with the index and transfer it to the charge record. It is obvious to those skilled in the art that data transfer may also be realized otherwise. It is essential that tariff data is directly or indirectly included in at least the short messages whose billing deviates from the system default value.

According to the invention, when application APP3 transmits a short message including a data item DATA2 requested by a subscriber to a short message service centre SMSC of the short message, it includes parameter PARA2 in the message, the parameter depicting tariff TF2 of the transmitted data for which the subscriber of the mobile communication system is to be billed. The short message service centre SMSC includes parameter PARA2 in the short message to be submitted, preferably in the form of an RL layer data message parameter.

When a short message arrives at the short message gateway MSC SMS-GMSC, the gateway MSC relays the message normally to be forwarded to a mobile station. Having received an acknowledgement that the short message has been received (RP-ACK), according to prior art the short message gateway MSC would create record TT, on the basis of which the sender of the short message would be charged a certain fixed unit price. In the solution of the invention, the short message gateway MSC SMS-GMSC checks if the message includes a parameter indicating the price of the message. When noticing that the short message includes said parameter, the MSC creates record TT comprising, in addition to standard data, information on the short message tariff. Thereafter record TT is transferred, in accordance with the normal routines of a mobile communication system, to a billing system for further processing. On the basis of the data included in record TT, the billing system is able to direct the billing to the MS subscriber at the price TF2 defined by the sender.

As can be seen, the procedure of the invention allows billing to be transferred message-specifically to the unit performing the billing, and from there onwards without existing routines having to be significantly changed. Billing may be performed by the same network element essentially by utilizing prior arrangements.

Figure 4:
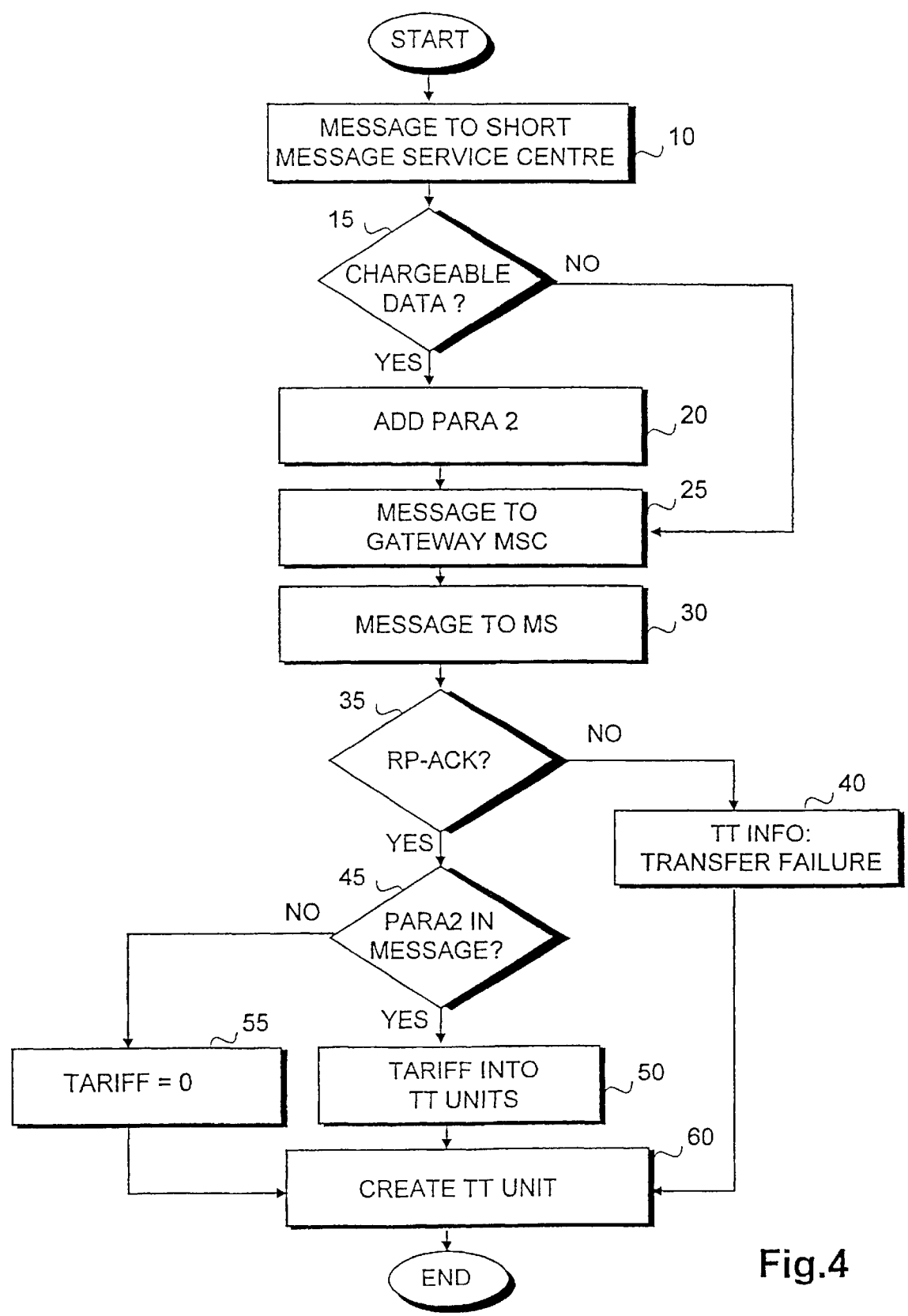
FIG. 4 is a flow diagram illustrating the method of the invention.

The flow diagram of FIG. 4 illustrates the method of the invention. At point 10 application APP3 submits a short message to the short message service centre SMSC to be relayed via the mobile communication network to a mobile station MS. At the same time, the short message service centre SMSC learns if such information is concerned for the reception of which the subscriber will be billed. In case of chargeable information (point 15), the short message service centre includes in the short message parameter PARA2, indicating price information associated with the short message (point 20). In case of charge-free information, transfer to point 25 occurs directly, and there the message is transferred to the short message gateway MSC SMS-GMSC. The gateway MSC sends the message to the mobile station MS (point 30) and waits for an acknowledgement (point 35) for reception of the message. If the message is not received within the life time defined for a short message, information on failed transfer is included in the charge record and also a code indicating the reason for the failure (point 40) for statistical purposes. According to the invention, if an acknowledgement is received, the short message gateway MSC SMS-GMSC checks if the message includes parameter PARA2 (point 45). If the message does include the parameter, the short message gateway MSC SMS-GMSC transfers the information to record TT (point 50). In case of charge-free information, the tariff is ignored (point 55). Finally the short message gateway MSC SMS-GMSC creates record TT in accordance with the system default value (point 60).

In the above described embodiment, record TT was created in the short message gateway MSC SMS-GMSC relaying short messages to the mobile communication system. In systems where record TT is created in the short message service centre SMSC, charge data does not have to be included in the short message, but instead the short message service centre SMSC can add the billing data directly to record TT being created.

In the above described embodiment, information on the fact that chargeable information was concerned directed the billing associated with the short message to the subscriber, but it is obvious to those skilled in the art that by the solution of the invention, billing may also be directed to another address. For example an ad that the subscriber is prepared to receive, could be directed to a third address by means of the described solution by adding parameters, whereby the advertiser would have to pay only for information relayed by an operator and received directly by a customer.

It is obvious to those skilled in the art that as methods are developed, the basic idea of the invention can be implemented in a variety of ways. Thus, the invention and its embodiments are not limited to the above described examples, but may vary within the scope of the claims.

What is claimed is:

1. A method of implementing the billing of short messages in a mobile communication system, the method comprising following steps:

a message is submitted to a short message service centre to be delivered to a subscriber, the message including short message service centre address, recipients address, originating address, an advice of charge, independent of originating address, indicating directly or indirectly the price to be billed for reception of the short message, and the object of the billing;

the message is delivered from the short message service centre to the mobile station of the subscriber via the mobile communication system; and at least one charge record is created per each transferred short message to which charge record said advice of charge or an actual advice of charge defined on the basis thereof is included.

2. The method of claim 1, wherein the charge record created on the basis of the short message is created in the short message gateway MSC of the mobile communication system.

3. The method of claim 1, wherein the advice of charge is included in the short message in the short message service centre.

4. The method of claim 2, wherein the advice of charge included in the short message in the short message service centre is directly obtained from an application program.

5. The method of claim 1, wherein the charge record created on the basis of the short message is created in the short message service centre.

6. A short message service centre to be linked to a mobile communication system, the centre relaying a submitted message to a subscriber mobile station via the mobile communication system, the short message service centre being arranged to include in a charge record created on the basis of the short message an advice of charge, independent of an originating address of the short message, indicating the price to be billed for the reception of the short message, and the object of the billing.

7. A short message service centre to be linked to a mobile communication system, the centre relaying a submitted message to a subscriber mobile station via the mobile communication system and creating at least one charge record on the basis of the short message, wherein the short message service centre is arranged to include in a charge record created on the basis of the short message an advice of charge, independent of an originating address of the short message, indicating the price to be billed for the reception of the short message, and the object of the billing.

8. A short message gateway MSC in a mobile communication system, the MSC relaying a short message sent by a short message service centre to a mobile station and creating at least one charge record on the basis of the short message, wherein the MSC is arranged to include in a charge record created on the basis of the short message an advice of charge, independent of an originating address of the short message, indicating the price to be billed for the reception of the short message, and the object of the billing.

* * * * *